United States Patent
Kuenstler et al.

(10) Patent No.: US 6,644,020 B2
(45) Date of Patent: Nov. 11, 2003

(54) DEVICE AND METHOD FOR REGENERATING AN EXHAUST GAS AFTERTREATMENT DEVICE

(75) Inventors: Johannes Kuenstler, Aachen (DE); Paul Eduard Moraal, Vaals (NL); Urs Christen, Aachen (DE); Yasser M. Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,196

(22) Filed: Sep. 25, 2002

(65) Prior Publication Data

US 2003/0056498 A1 Mar. 27, 2003

(30) Foreign Application Priority Data

Sep. 25, 2001 (GB) .............................. 01122902

(51) Int. Cl.⁷ ................................. F01N 3/00
(52) U.S. Cl. .............. 60/286; 60/274; 60/297; 60/303; 123/299; 123/399; 123/676
(58) Field of Search .............. 60/274, 284, 285, 60/286, 297, 311, 303; 123/295, 299, 399, 676

(56) References Cited

U.S. PATENT DOCUMENTS

| | | | |
|---|---|---|---|
| 4,211,075 A | 7/1980 | Ludecke et al. | |
| 4,270,936 A | 6/1981 | Mann | |
| 4,656,155 A | 4/1987 | Josefowicz | |
| 4,686,827 A | 8/1987 | Wade et al. | |
| 5,014,511 A | 5/1991 | Wade et al. | |
| 5,042,248 A | 8/1991 | Abthoff et al. | |
| 5,195,318 A | 3/1993 | Shinzawa et al. | |
| 6,304,815 B1 * | 10/2001 | Moraal et al. | 60/285 |
| 6,340,014 B1 * | 1/2002 | Tomita et al. | 123/295 |
| 6,378,297 B1 * | 4/2002 | Ito et al. | 60/285 |
| 6,484,495 B2 * | 11/2002 | Minami | 60/285 |
| 6,490,857 B2 * | 12/2002 | Sasaki | 60/285 |

FOREIGN PATENT DOCUMENTS

| | | |
|---|---|---|
| DE | 19927485 | 2/2000 |
| EP | 0341832 B1 | 1/1996 |
| EP | 0743429 A2 | 11/1996 |
| EP | 0784738 B1 | 5/1998 |
| EP | 1035313 A2 | 9/2000 |
| FR | 2774427 | 8/1999 |
| JP | 58-055020 | 4/1983 |
| JP | 59-122721 | 7/1984 |
| JP | 60-43113 * | 3/1985 |
| JP | 59-150921 * | 8/1994 |
| JP | 200064889 | 2/2000 |

* cited by examiner

Primary Examiner—Thomas Denion
Assistant Examiner—Tu M. Nguyen
(74) Attorney, Agent, or Firm—Diana D. Brehob

(57) ABSTRACT

The invention relates to a method for regenerating a particulate filter in the exhaust system of a diesel engine, an increase in the temperature of the exhaust gases being brought about by post-injection of fuel. The intake pressure (MAP) and/or the air mass flow rate (MAF) are reduced as a function of the ambient temperature of the engine and preferably also when the engine load is low by throttling the engine. In this way, the proportions of burned or unburned post-injected fuel can be stabilized.

21 Claims, 2 Drawing Sheets

DEVICE AND METHOD FOR REGENERATING AN EXHAUST GAS AFTERTREATMENT DEVICE

BACKGROUND OF INVENTION

1. Field of the Invention

The invention relates to a method for regenerating an exhaust gas aftertreatment device in the exhaust system of an internal combustion engine, and more particularly to a particulate filter in the exhaust system of a diesel engine. According to-the method the temperature of the exhaust gases, the hydrocarbon concentration of the exhaust gases, or both are increased by post injection of fuel into the engine. In addition, the invention relates to an internal combustion engine, in particular a diesel engine, designed to carry out the aforesaid method.

2. Background of the Invention

To reduce the harmful emissions from internal combustion engines, exhaust gas aftertreatment devices are placed in the exhaust gas path to process legislated exhaust gas constituents. One such device is a particulate filter which removes unburned particulates of soot from the exhaust gas. Particulate filters are regenerated periodically by burning the accumulated filter residues. The carbon contained in the filter residues ignite only at relatively high temperatures of approximately 550° C., if there is no catalytic support. Such temperatures are only reached under conditions with at high engine speeds and torques. To ensure the operation of the particulate filter, measures are taken to increase exhaust gas temperature sufficiently during a regeneration under all operating conditions of the engine.

Various procedures have been proposed for increasing exhaust gas temperature. For example, by switching on electrical loads, it is possible to increase the engine loading. Additional fuel can be injected into the combustion space or into the exhaust gas ducts. As a result, unburned hydrocarbons are fed to a catalytic converter arranged upstream of the particulate filter. These hydrocarbons are oxidized, thereby creating an exotherm in the catalytic converter and raising the exhaust temperature.

Post injection of fuel has proven particularly effective in raising exhaust temperature. Post injection is injection of an additional quantity of fuel into one or all cylinders after the main injection, i.e., during the expansion stroke. Depending on the quantity and the start of the post injection event, a portion of the injected fuel burns in the cylinder and contributes both to engine torque and to an increase in the exhaust gas temperature at the outlet of the engine. The remaining part of the fuel vaporizes and leaves the engine in the form of unburned hydrocarbons. If an oxidation catalytic converter is arranged upstream of the particulate filter and if said oxidation catalyst converter has a sufficiently high temperature, the unburned hydrocarbons oxidize in an exothermic reaction cause a temperature increase in the exhaust gases. However, if the temperature of the oxidation catalytic converter is too low, the hydrocarbons do not oxidize and, thus, leave the exhaust gas system unburned.

While post injection is being carried out, the injected quantity of fuel, and in particular the time of the injection, are to be matched very precisely in to ensure that:

the maximum temperature limits of the turbine and of the exhaust system are not exceeded;

the enthalpy release rate in the catalytic converter does not exceed acceptable limits;

emission of unburned hydrocarbons does not exceed acceptable limits;

additional torque generated by the post injection does not cause the total generated torque to exceed desired torque.

While compliance with all these conditions is already demanding under normal conditions, an aggravating factor is that, in practice, ambient conditions vary considerably. These affect the conditions (temperature, pressure) which prevail in the cylinder at the time of post injection and have a decisive influence on the proportion of post-injected fuel which is burned. An excessively high proportion of unburned hydrocarbons can lead to cooling of the oxidation catalytic converter to below the threshold temperature for oxidation. This leads to an additional drop in the exhaust gas temperature so that the desired regeneration of the particulate filter does not occur. In addition, an excessively high concentration of hydrocarbons downstream of the catalytic converter leads to an unpleasant unacceptable smell. The torque may also be less in such a situation than is expected on the basis of the position of the accelerator pedal.

SUMMARY OF INVENTION

Against this background, the present invention provides a method for regenerating an exhaust gas aftertreatment device which enables the effects of a post injection to be stabilized. In particular, the present invention is a method for regenerating an exhaust gas aftertreatment device disposed in the exhaust system of an internal combustion engine, the engine having a throttle valve disposed in the engine intake and a fuel injector disposed in a combustion cylinder of the engine capable of multiple injections during a combustion cycle. Fuel is injected into the combustion cylinder at least twice in a single engine cycle, including a main injection followed by a post injection. The throttle valve is regulated to provide a desired value of an exhaust gas parameter.

In one embodiment, the exhaust gas parameter is exhaust gas temperature. Alternatively, the exhaust gas parameter is exhaust gas hydrocarbon concentration.

The proposed method for regenerating an exhaust gas aftertreatment device in the exhaust system of an internal combustion engine may be used in particular for regenerating a particulate filter in the exhaust system of a diesel engine. In the method, the temperature of the exhaust gases and/or the concentration of the unburned hydrocarbons in the exhaust gas are increased by a post injection of fuel in the working cycle of the internal combustion engine. The method is defined by virtue of the fact that the values predetermined by the engine controller for the intake pressure (MAP) and/or for the air mass flow rate (MAF) are changed as a function of a variable whose value is correlated with the ambient temperature of the engine or of the internal combustion engine, in such a way that stable values of the exhaust gas temperature and/or of the concentration of hydrocarbons in the exhaust gas are achieved by the post injection.

The method according to the invention thus achieves stable effects of the post injection with respect to the exhaust gas temperature and the concentrations of hydrocarbons by virtue of the fact that the ambient temperature of the engine or of the motor vehicle is taken into account in the setting of the intake pressure and/or of the air mass flow rate. They are taken into account here in the form of a correction of the values predetermined by the engine controller on the basis of other, conventional criteria. It has become apparent that such a measure can enable a reliable regeneration of the exhaust gas aftertreatment device, for example of the particulate filter in the exhaust gas system of a diesel engine, to take place even under greatly varying ambient conditions. Here, the strategies used for the stabilization are relatively simple, i.e., regulating the intake pressure or air mass flow rate. An advantage of the present method is that complex measures, for example preheating of the supplied air mass flows to ensure uniform temperature in the combustion space is not necessary.

The predetermined values for the intake pressure and/or the air mass flow rate can be changed in such a way that at the time of the post injection, the temperature in the combustion space of the internal combustion engine does not drop below a predetermined threshold. It has become apparent that the temperature in the combustion space at the time of the post injection has a decisive influence on how complete combustion of the post-injected quantity proceed or whether fuel leaves the engine without being burned. By regulating the throttle valve, temperature in the combustion chamber is regulated in such a way that it does not drop below a specific threshold so that the desired exhaust gas temperature and/or the concentration of the hydrocarbons can be achieved.

A variety of indirect variables which are correlated to the ambient temperature are available for determining the ambient temperature. However, the ambient temperature is preferably measured directly by a suitable sensor.

According to one specific refinement of the method according to the invention, the lower the ambient temperature of the engine or of the motor vehicle the greater the reduction in the predetermined values for the intake pressure and/or for the air mass flow rate. The reduction in the values for the intake pressure or the air mass flow rate causes the combustion of the quantity of fuel from the main injection to take place more slowly so that relatively high temperatures still prevail in the combustion chamber at the time of the post injection. This measure is therefore advantageously set at a higher level the lower the ambient temperature.

According to one development of the method, the predetermined values for the intake pressure and/or for the air mass flow rate are additionally corrected if the greater operating temperature of the internal combustion engine has not yet been reached. The operating temperature of the internal combustion engine can be based on coolant temperature or cylinder head temperature, both of which are continuously measured and monitored in any case. Operating temperature of the engine constitutes a further decisive influencing parameter indicating temperature in the cylinder at the time of post injection of fuel.

According to another development of the invention, the predetermined values for the intake pressure and/or the air mass flow rate are reduced when the engine load is low in such a way that stable values of the exhaust gas temperature and/or of the concentration of hydrocarbons are obtained in the exhaust gas as a result of the post injection. That is, even a low engine load can lead to a reduction in the intake pressure/air mass flow rate independently of, or in addition to, the temperature of the surroundings. It is therefore advantageous if a relatively high temperature is generated in the combustion chamber by reducing the intake pressure or the air mass flow rate at the time of the post injection.

The predetermined values for intake pressure and/or air mass flow rate can be determined in the conventional way by an engine controller. In particular, they can be determined as a function of engine speed and engine load or desired engine torque.

To ensure good driving characteristics during the regeneration of the exhaust gas aftertreatment device, the throttling, brought on by the change in the predetermined values for the intake pressure and/or the air mass flow rate, can be reduced or entirely eliminated if a high degree of acceleration and/or a high engine load is present or desired.

The invention also relates to an internal combustion engine with an exhaust gas aftertreatment device arranged in the exhaust system, and with a control device for regenerating the exhaust gas aftertreatment device by increasing the temperature and/or the concentration of hydrocarbons in the exhaust gases. The internal combustion engine can be, in particular, a diesel engine, and the exhaust gas aftertreatment device can be, in particular, a particulate filter. The control device is configured in such a way and connected to sensors and actuators in such that the latter can carry out the method of the present invention.

The control device contains, in particular, a unit for registering a variable which is correlated to the ambient temperature, and that the control unit can influence the intake pressure which is set and/or the air mass flow rate. This influence is exerted as a function of the aforesaid correlating variable in such a way that predetermined values for the intake pressure and/or the air mass flow rate are changed in such a way that stable values of the exhaust gas temperature and/or of the concentration of hydrocarbons in the exhaust gas are achieved by the post injection.

The control device is preferably connected to a temperature sensor measuring temperature of the engine and/or of the motor vehicle and/or temperature of the charge air and/or ambient temperature. This temperature is taken into account in the change in the intake pressure and/or in the air mass flow rate.

BRIEF DESCRIPTION OF DRAWINGS

The invention is explained below in more detail, by way of example, with to the Figures, wherein.

DETAILED DESCRIPTION

Figure 1:
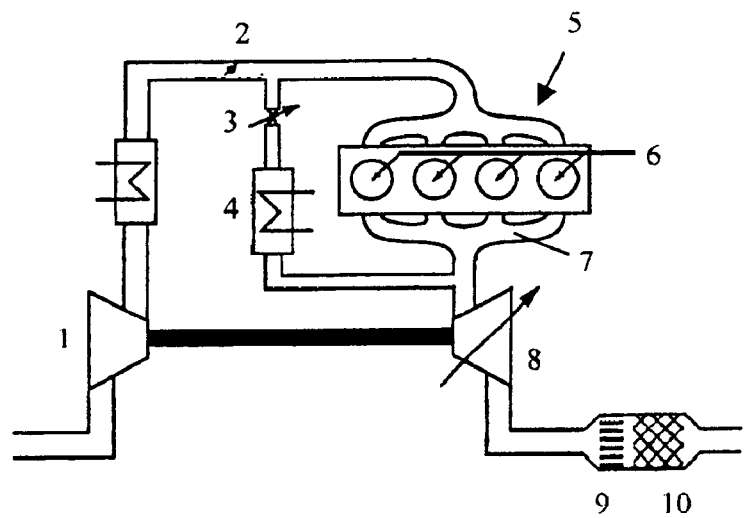
FIG. 1 is a schematic view of the components of a diesel engine with an exhaust gas aftertreatment device.

FIG. 1 presents a typical arrangement of a diesel engine 5, in which arrangement the method according to the invention can be advantageously applied. In this arrangement, air is sucked in via a compressor 1 and made available to diesel engine 5 via its intake manifold. An intake throttle 2 is provided in the air path from compressor 1 to diesel engine 5. Fuel is injected into the cylinders of diesel engine 5 via fuel injection nozzles 6 and burned together with the air. The fuel injection nozzles and the engine controller are capable of providing a plurality of fuel injections per working cycle, in particular a post injection during the working cycle, i.e., after the main injection.

The exhaust gases, which are produced during the combustion, leave diesel engine 5 via an exhaust gas manifold 7. A portion of these exhaust gases is fed back via exhaust gas recirculation (EGR) to the intake of diesel engine 5. This EGR system has an EGR radiator 4 and an EGR valve 3. EGR rate is controlled via valve 3. The rest of the exhaust gases flow through a variable geometry turbine (VGT). The turbine is coupled to and drives compressor 1. EGR and VGT 8 are typical components of modern automotive diesel engines, but are unnecessary for the execution of the method according to the invention.

The exhaust gases flow into an exhaust gas aftertreatment system, which is composed of an oxidation catalytic converter 9 and a particulate filter 10 located downstream of engine 5.

To clean the particulate filter 10 of hydrocarbon residues, it is known to increase the exhaust gas temperature to such an extent that the residues burn. A particularly suitable measure for increasing exhaust gas temperature is post injection of fuel during the expansion stroke. Such a post injection is illustrated schematically in FIG. 2. Engine rotation is plotted, in angular degrees, on the horizontal axis. Main injection A and post injection B are illustrated as blocks above the horizontal axis wherein post injection starts 30° after the top dead center. The lower line of the injection blocks applies to an ambient temperature Tu of 20° Celsius, while the upper line applies to another ambient temperature Tu of −20° Celsius.

Dividing the block for the post-injected quantity B of fuel into two partial blocks "T" and "HC" indicates that a portion (T) of the post-injected fuel B burns in the cylinder and as a result leads to an increase in temperature, while the remaining fuel leaves the cylinder without being burned (HC).

The size of the respective proportions of burned fuel (T) and unburned fuel (HC) depends mostly on the time of the poet injection. This dependence was determined experimentally and the results are plotted in FIG. 3. The left-hand vertical axis and the dashed curve correspond to exhaust gas temperature, while the right-hand vertical axis and the unbroken curve represent concentration of the hydrocarbons leaving the engine. Both curves are plotted as a function of the start of post injection, which is measured in angular degrees after top dead center. The measured values were collected at constant engine operating conditions: 1000 rpm and 10 Nm torque.

Figure 3:
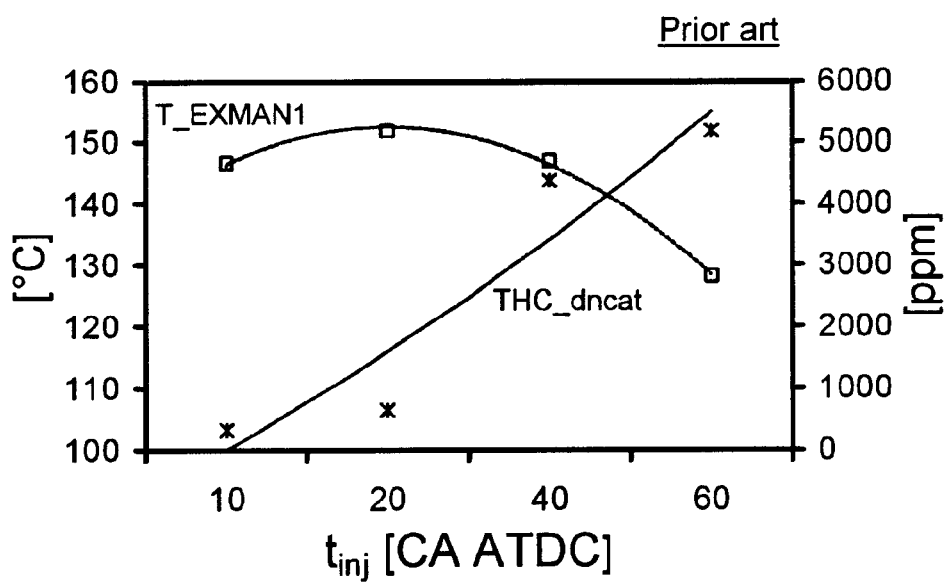
FIG. 3 is a graph of exhaust gas temperature and concentration of hydrocarbons in the exhaust gas as a function of the start of post injection time according to the prior art.

From FIG. 3 a very marked rise in the concentration of hydrocarbons occurs as soon as the time of the post injection exceeds a specific crank angle degree. The precise position, however, depends on the conditions in the cylinder at the time of post injection.

Figure 2:
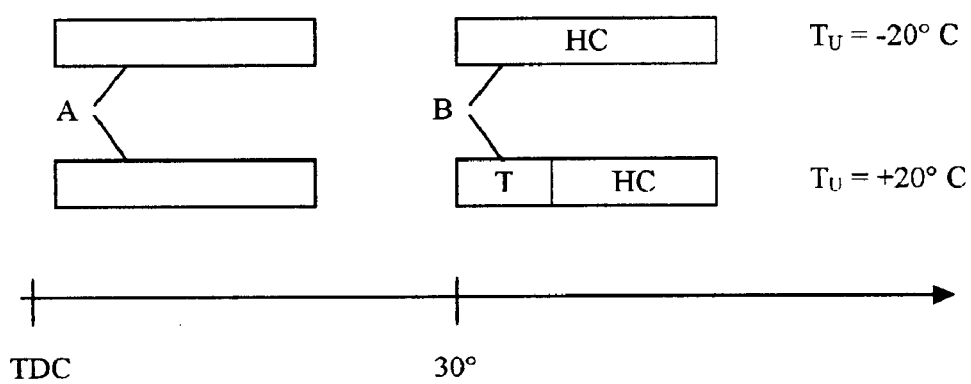
FIG. 2 is a qualitative representation of the dependence of the effect of the post injection on the ambient temperature.

Furthermore, the effect of post injection depends critically on ambient conditions as seen in FIG. 2 at an ambient temperature of −20 degrees Celsius. The intake temperature is indicative of ambient conditions. At such low temperatures, there is no longer appreciable combustion of post-injected fuel. Thus, post-injected fuel leaves the engine as vaporized hydrocarbons. Consequently, post injection does not bring about any temperature increase in the exhaust and the extra hydrocarbons in the exhaust bring about cooling of the oxidation catalytic converter. In the worst case, the temperature of the oxidation catalytic converter drops below the temperature necessary for oxidation of the hydrocarbons.

The sensitivity of the oxidation of the hydrocarbons to post injection timing is particularly pronounced at low engine torque when combustion energy released from the main injection is relatively low. If post injection is too late, only unburned hydrocarbons are generated. If post injection is too early, post-injected fuel burns almost completely and leads to an increase in the torque output of the engine without significantly increasing the exhaust gas temperature. Although the increase in torque can be compensated by a corresponding reduction in the main injection, there is a lower limit for the injection quantity below which the injection devices can no longer operate with sufficient precision. This lower limit is virtually reached for the main injection during normal engine operation when engine torque is low (approximately 6–8 mg/cycle).

Particularly at low engine torque there is a narrow time window for post injection of fuel. If not in this window, engine torque rises without a corresponding rise in the exhaust gas temperature. Or, the concentration of hydrocarbons rises beyond an acceptable level and the exhaust gas temperature does not increase sufficiently.

To solve the problems described above, the invention utilizes the intake throttle to ensure stable combustion of the post-injected fuel independent of ambient conditions. According to the present invention, use of the throttle valve widens the time window. In other words, the sensitivity in post injection timing with respect to the ambient conditions is reduced. This effect is achieved as described below.

For cold ambient conditions, which are sensed by a temperature sensor arranged on the vehicle in the vicinity of the engine or in the intake manifold, the intake air flow is throttled with feedback based on a signal from a manifold absolute pressure (MAP) or a mass air flow (MAF) sensor. In the following discussion, control is based on MAP, by way of example. But the same principles can be applied to regulation based on MAF.

A predetermined value of the intake pressure is based on engine speed and torque (or of desired torque). This is determined by a functional relationship or a lookup table. The predetermined value is then corrected in relation to the ambient temperature. Additionally, the predetermined value can be corrected for other factors such as engine coolant temperature. In the case of low ambient temperature, the intake is throttled to cause a lower value of the intake pressure. Details for carrying out throttle control to obtain a desired intake pressure is found in pending U.S. Ser. No. 09/538,521.

The reduction of the intake pressure causes the combustion rate to slow down. Consequently, temperature in the cylinder at the time of the post injection is increased in comparison with the unthrottled case. For this reason, combustion while using post injection can be carried out with the same stability as under normal ambient conditions.

At low engine torque, intake airflow is throttled using the measures described above. That is, the predetermined value of the intake pressure is generated in the same way as a function of rotational speed, torque, ambient temperature or intake temperature, coolant temperature and the like. If engine torque is low, intake pressure is reduced even under normal ambient conditions. This has two effects: the combustion rate is reduced due to the reduced pressure at the start of the main injection, and combustion temperature increases due to the reduced mass flow. Both cause temperature in the cylinder to be increased at the time of post injection. Thus, the time window, within which the post injection can take place to achieve substantially complete combustion, is expanded.

Figure 4:
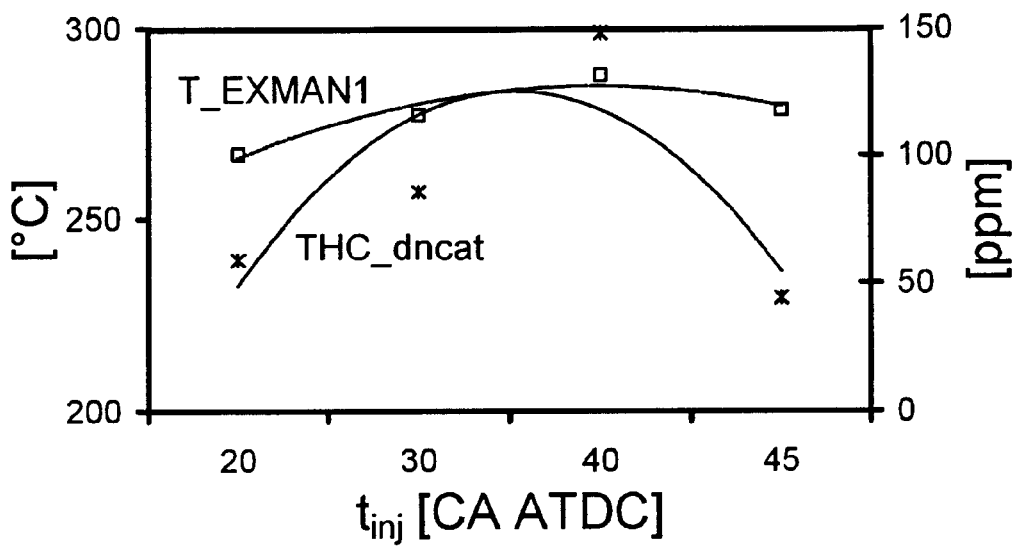
FIG. 4 is a graph of exhaust gas temperature and concentration of hydrocarbons in the exhaust gas as a function of the start of post injection according to an aspect of the present invention.

FIG. 4 shows the effects explained above in a measured data diagram. The significance of the axes and the curves is selected here to be similar to FIG. 3 but the different value ranges of the axes are indicated. In FIG. 4 when the strategy of the invention is applied, exhaust gas temperature and the concentration depends less strongly upon post-injection timing.

If desirable, the effects of the throttling strategy on the driving behavior of the motor vehicle, according to the invention, can be prevented. Throttling can be reduced or entirely eliminated when a high degree of acceleration is requested or when the engine is operating in the vicinity of full torque.

We claim:

1. A method for regenerating an exhaust gas aftertreatment device disposed in the exhaust system of an internal combustion engine, the engine having a throttle valve disposed in the engine intake and a fuel injector disposed in a combustion cylinder of the engine configured for multiple injections during a combustion cycle, comprising:
  injecting fuel into the combustion cylinder at least twice in a single engine cycle, said injections including a main injection followed by a post injection; and
  regulating a position of the throttle valve to provide a desired value of an exhaust gas parameter wherein said regulation is based on an estimated ambient temperature.

2. The method of claim 1 wherein said exhaust gas parameter is exhaust gas temperature.

3. The method of claim 1 wherein a value of intake manifold pressure to provide said desired value of an exhaust gas parameter is determined and said regulation of the throttle valve is based on providing said value of intake manifold pressure.

4. The method of claim 1 wherein a value of intake mass airflow to provide said desired value of said exhaust gas parameter is determined and said regulation of the throttle valve is based on providing said value of intake mass airflow.

5. The method of claim 1 wherein the engine is a diesel engine.

6. A method for regenerating an exhaust gas aftertreatment device disposed in the exhaust system of an internal combustion engine, the engine having a throttle valve disposed in the engine intake and a fuel injector disposed in a combustion cylinder of the engine configured multiple injections during a combustion cycle, comprising:
  injecting fuel into the combustion cylinder at least twice in a single engine cycle, said injections including a main injection followed by a post injection; and
  regulating a position of the throttle valve to provide a desired value of an exhaust gas parameter wherein the position of the throttle valve is regulated so that temperature in the combustion cylinder does not drop below a predetermined threshold at the time of said post injection.

7. The method of claim 6 wherein the throttle valve is regulated more toward a closed position when ambient temperature is lower.

8. The method of claim 6 wherein said regulation is based on a coolant temperature of the engine.

9. The method of claim 6 wherein the throttle valve is regulated more toward a closed position when coolant temperature is lower.

10. The method of claim 6 wherein the regulation is discontinued during a demand for a high acceleration rate.

11. An internal combustion engine, comprising:
  an exhaust gas aftertreatment device arranged in an engine exhaust;
  a throttle valve disposed in an engine intake;
  a fuel injector disposed in each of engine combustion cylinders, said injector providing a main injection followed by a post injection, said injections occurring within a single engine cycle; and
  an electronic control unit operably connected to the engine, said electronic control unit adjusting a timing of said post injected fuel and a position of said throttle valve to provide a desired value of an exhaust ass parameter wherein said desired value of said exhaust gas parameter leads to regeneration of said exhaust ass aftertreatment device wherein said throttle valve is adjusted to provide a predetermined intake manifold pressure.

12. The engine of claim 11 wherein said predetermined intake manifold pressure decreases as an engine parameter indicative of ambient temperature decreases.

13. The engine of claim 11 wherein said throttle valve is adjusted to provide a predertermined intake mass airflow.

14. The engine of claim 13 wherein said predetermined intake mass airflow decreases as an engine parameter indicative of ambient temperature decreases.

15. A method for regenerating a particulate filter disposed in the exhaust system of a diesel engine, the engine having a throttle valve disposed in the engine intake and a fuel injector disposed in a combustion cylinder of the engine configured for multiple injections during a combustion cycle, comprising:
  injecting fuel into the combustion cylinder at least twice in a single engine cycle, said injections including a main injection followed by a post injection; and
  determining a desired input value for an engine intake parameter to provide a desired output value of an engine exhaust parameter;
  basing said desired input value on an estimated ambient temperature; and
  regulating a position of the throttle valve to provide said desired output value.

16. The method of claim 15 wherein said exhaust parameter is exhaust gas temperature and said desired output value is a temperature.

17. The method of claim 15 wherein said exhaust parameter is exhaust gas hydrocarbon concentration and said output value is a concentration.

18. The method of claim 15 wherein said intake parameter is a mass air flow and said desired input value is a mass flow rate.

19. The method of claim 15 wherein said intake parameter is a manifold absolute pressure and said desired input value is a pressure.

20. An internal combustion engine, comprising:
  an exhaust gas aftertreatment device arranged in an engine exhaust;
  a throttle valve disposed in an engine intake;
  a fuel injector disposed in each of engine combustion cylinders, said injector providing a main injection followed by a post injection, said injections occurring within a single engine cycle; and
  an electronic control unit operably connected to the engine, said electronic control unit adjusting a position of said throttle valve to provide a desired value of an exhaust gas parameter and to provide a predetermined intake manifold pressure wherein said desired value of said exhaust gas parameter leads to regeneration of said exhaust gas aftertreatment.

21. An internal combustion engine, comprising:
  an exhaust gas aftertreatment device arranged in an engine exhaust;

a throttle valve disposed in an engine intake;

a fuel injector disposed in each of engine combustion cylinders, said injector providing a main injection followed by a post injection, said injections occurring within a single engine cycle; and an electronic control unit operably connected to the engine, said electronic control unit adjusting a position of said throttle valve to provide a desired value of an exhaust gas parameter and to provide a predetermined intake mass airflow wherein said desired value of said exhaust gas parameter leads to regeneration of said exhaust gas aftertreatment.

* * * * *